Figure 1:
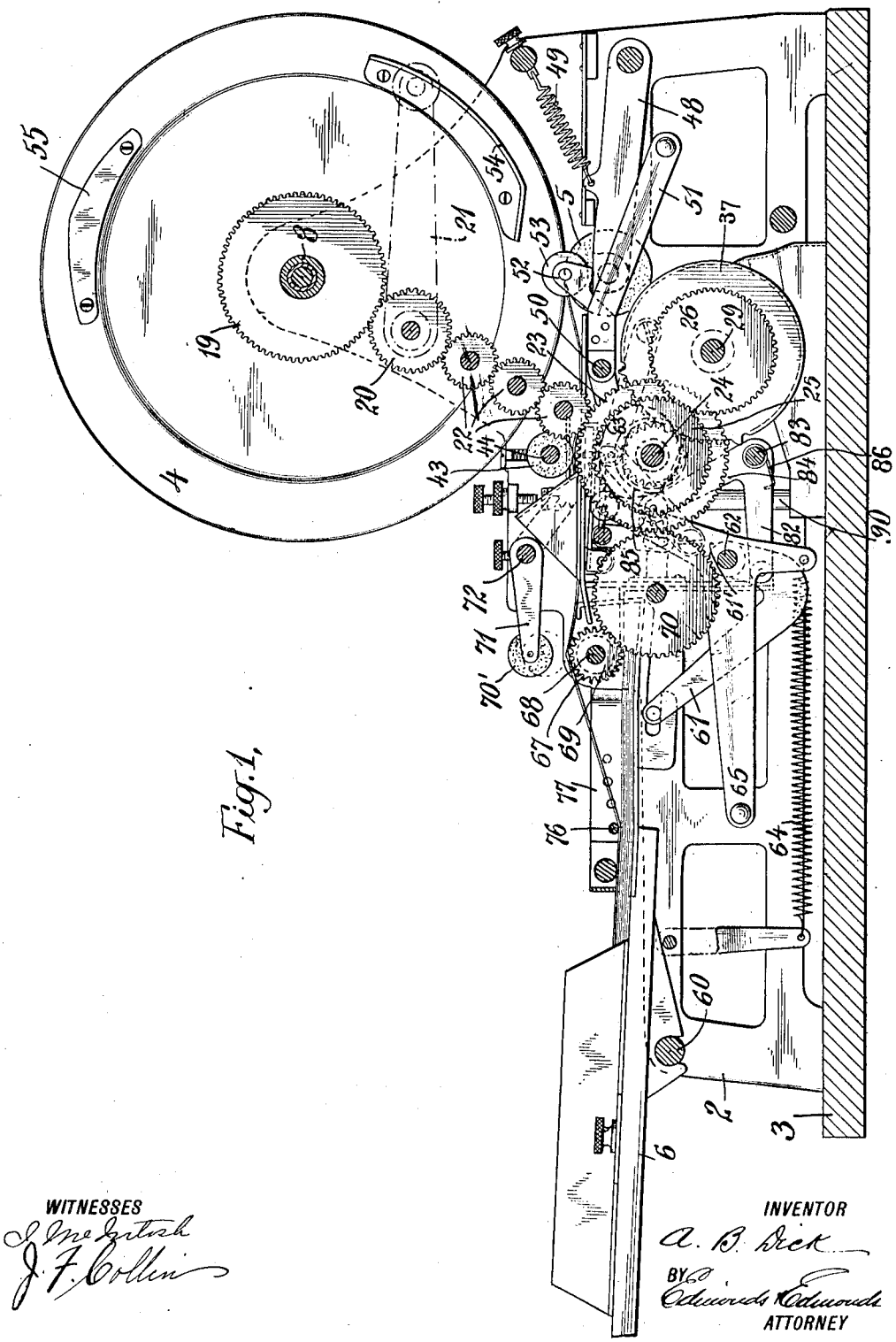

A. B. DICK.
STENCIL DUPLICATING MACHINE.
APPLICATION FILED JUNE 10, 1912.

1,054,399.

Patented Feb. 25, 1913.

4 SHEETS—SHEET 1.

WITNESSES

INVENTOR
A. B. Dick
BY
Edwards & Edwards
ATTORNEY

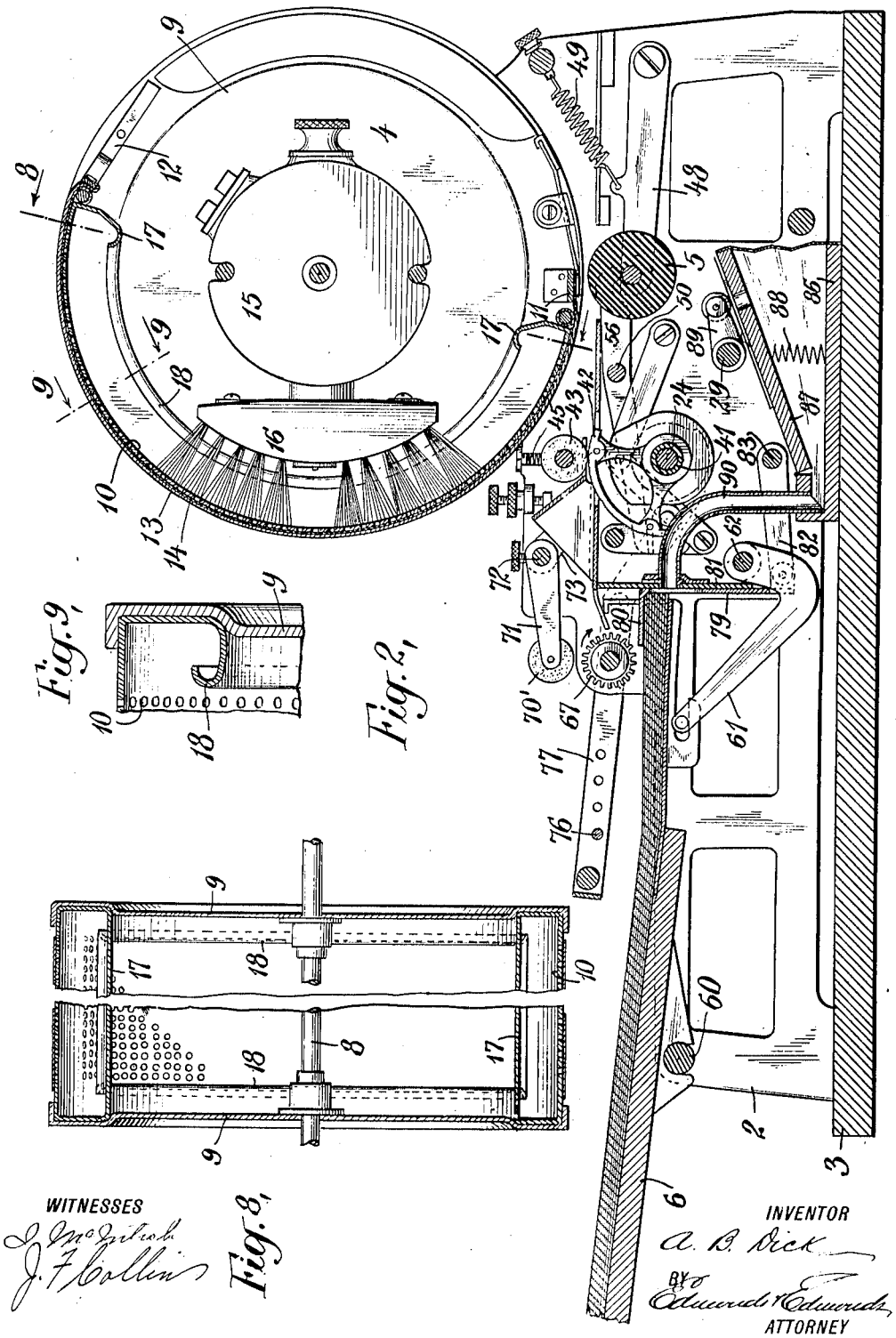

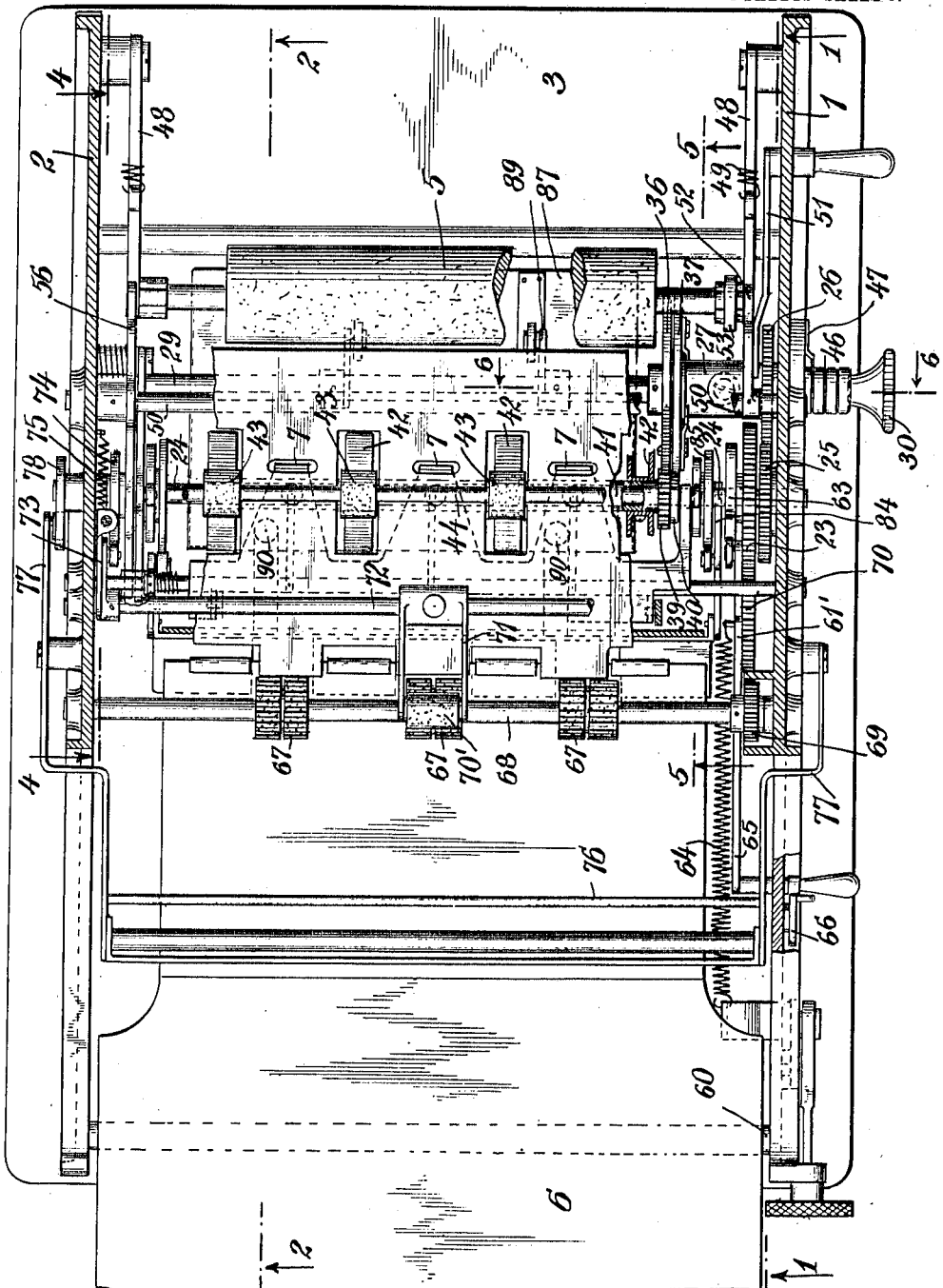

A. B. DICK.
STENCIL DUPLICATING MACHINE.
APPLICATION FILED JUNE 10, 1912.
1,054,399.
Patented Feb. 25, 1913.
4 SHEETS—SHEET 4.
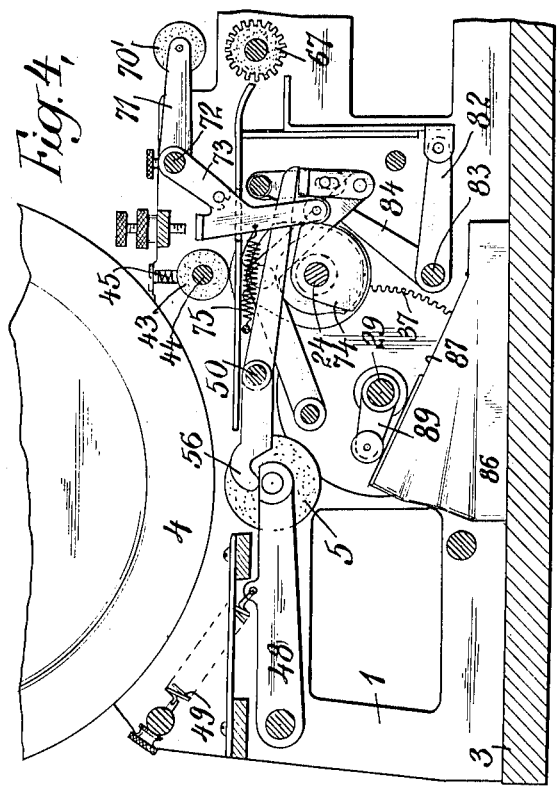
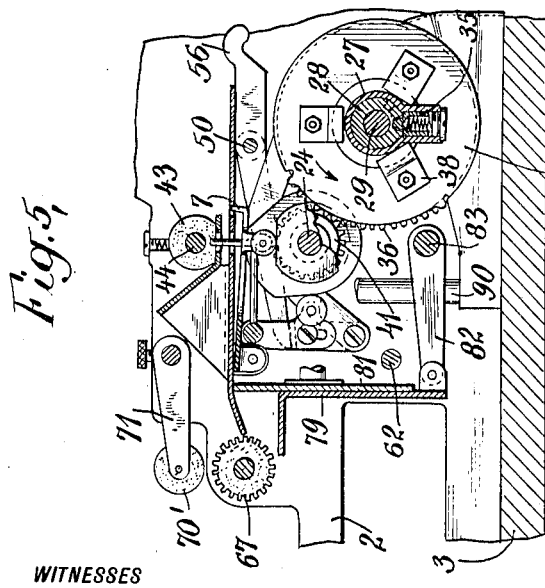
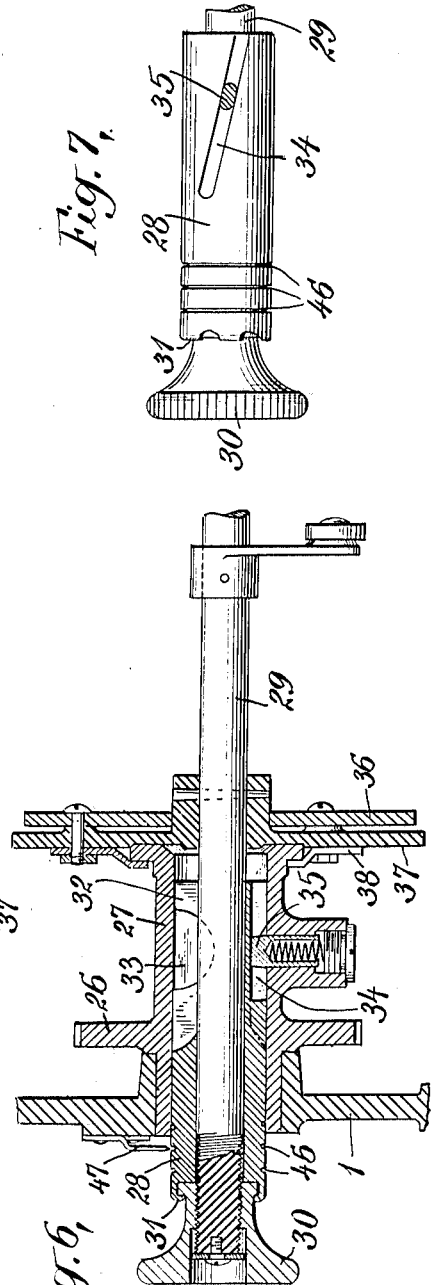

UNITED STATES PATENT OFFICE.

ALBERT B. DICK, OF LAKE FOREST, ILLINOIS, ASSIGNOR TO A. B. DICK COMPANY, OF CHICAGO, ILLINOIS, A CORPORATION OF ILLINOIS.

STENCIL-DUPLICATING MACHINE.

1,054,399. Specification of Letters Patent. Patented Feb. 25, 1913.

Application filed June 10, 1912. Serial No. 702,653.

*To all whom it may concern:*

Be it known that I, ALBERT B. DICK, a citizen of the United States, residing at Lake Forest, in the county of Lake and State of Illinois, have invented certain new and useful Improvements in Stencil-Duplicating Machines, of which the following is a specification.

This invention is directed to the provision of an improved form of machine for making duplicate copies from a suitable stencil.

The object of the invention is to effect certain improvements in the construction of machines of this character whereby such a machine is made more convenient to operate and to make the necessary adjustments, and whereby the operation of the machine is made more efficient and reliable.

One feature of the present invention resides in the provision of means for conveniently effecting an adjustment of the time in the rotation of the drum when a sheet is forwarded to the drum and pressure-roller. This means is such that it may be very conveniently manipulated and minute adjustment can be made so as to get exact registration. Preferably the machine is provided with automatic intermittently-acting sheet-feeding devices and the time of operation of these devices with respect to the rotation of the drum is made adjustable. This regulation is effected by two relatively adjustable members arranged in the driving connection to the sheet-feeding devices, one of these members having an inclined slot therein and the other a pin coacting with this slot. By moving the slotted member and the pin relatively, the required change can be made in the time when the mechanism for continuously rotating the drum effects the intermittent actuation of the paper-feeding devices.

Another feature of the present invention involves the provision of a bellows actuated at regular intervals during the operation of the drum of the machine and arranged to direct a blast of air against the edge of a pile of paper so that the top sheet of the pile may be more readily withdrawn from the pile and fed into position with its end between the drum and the pressure-roller.

The preferred embodiment of the invention is illustrated in the accompanying drawings in which—

Figure 1 is a longitudinal section of the machine on line 1—1 of Fig. 3, Fig. 2 is a longitudinal section of the machine on line 2—2 of Fig. 3, Fig. 3 is a horizontal section of the machine directly below the drum, certain of the parts being broken away, Fig. 4 is a longitudinal section on line 4—4 of Fig. 3, Fig. 5 is a sectional detail view on line 5—5 of Fig. 3, Fig. 6 is a sectional detail view of the adjusting device on line 6—6 of Fig. 3, Fig. 7 is a detail view of the adjusting device, Fig. 8 is a section of the drum on line 8—8 of Fig. 2, broken away in part and Fig. 9 is a sectional detail view on line 9—9 of Fig. 2.

Referring to these drawings, the machine illustrated consists of two parallel side frames 1 and 2 mounted upon a suitable base 3 and having a drum 4 mounted for rotation between them. This drum is adapted to have a stencil-sheet secured upon its cylindrical surface and it coacts with a pressure-roller 5 mounted directly below the drum. The sheets to be printed upon are fed successively between the drum and pressure-roller and the rotation of these two parts causes the sheet to be imprinted upon and forwarded between them. The machine illustrated is provided with a feed-board 6 upon which a pile of sheets is arranged and these sheets are fed automatically from the top of the pile against stops 7 which temporarily arrest the movement of the sheets. After a sheet has been so arrested it is gripped by intermittently rotated sheet-forwarding devices and moved forward until the edge of the sheet is projected over the pressure-roller 5. Immediately thereafter the pressure-roller is raised in coaction with the drum. The machine illustrated is also provided with automatic throw-off mechanism whereby if no sheet is forwarded into coaction with the stops 7 so that it may be moved into position for printing by the sheet-forwarding devices, the pressure-roller 5 will not be raised as it would be if a sheet were forwarded but instead will be held out of coaction with the drum so that no ink will be received upon the surface of the pressure-roller.

Referring first to Figs. 1, 2, 8 and 9 the construction of the drum will be described in detail. The drum is mounted upon a shaft 8 and consists of two parallel heads 9 and a foraminated sheet of metal 10 which constitutes the stencil-carrier. This stencil-carrier extends but a portion of the way around the cylindrical surface of the drum as shown in Fig. 2. Adjacent to one end of the stencil-carrier means are provided for securing one end of a stencil-sheet to the drum. In the present instance this means consists of a bar 11 extending between the heads of the drum and provided with studs which enter slots in the stencil-sheet. The opposite end of the stencil is secured in position by means of a bail 12 pivotally mounted upon the heads of the drum. The stencil-sheet 13 overlies the stencil-carrier 10, an ink pad 14 being inserted between the sheet and the carrier. This ink pad may be secured in position in any suitable manner as by having loops in its ends through which pass rods which are received in suitable sockets upon the heads of the carrier. Any suitable means may be provided for supplying ink to the inner surface of the carrier 10. The ink may be supplied by hand and spread around upon the surface of the carrier with a suitable brush. In the present instance, however, I have shown an ink receptacle 15 and brush 16 mounted within the drum and adapted to be moved longitudinally and circumferentially with respect to the drum by means of a suitable handle in the manner illustrated and described in U. S. Patent No. 922,862, heretofore granted to me. The ink used on machines of this type is comparatively thin and is apt to flow from the carrier upon other parts of the machine, particularly the inner surface of the heads of the drum. This is the more apt to occur because, when the operation of the machine is discontinued, the drum is apt to be left in any position of its rotational movement. I have, therefore, so constructed the drum as to preclude such objectionable flow of the ink, as a result of which the operation of the machine is made far more cleanly. This means consists in the provision of ink-receiving members extending entirely around the stencil-carrier, that is, across the drum at each end of the stencil-carrier and along each of the lateral edges of the carrier. By reference to Fig. 2 it will be seen that at each end the metal of the carrier 10 or a strip of metal connected to the carrier is bent inwardly of the drum and then curled outwardly toward the carrier as shown at 17. In this way a trough is provided extending across the drum at each end of the stencil-carrier 10. Fig. 8 is a section through these two longitudinal troughs. At the lateral edges of the stencil-carrier the latter, or a part secured thereto, is similarly bent inwardly and curled to form a trough as shown at 18 in Figs. 2 and 9. These troughs at the lateral edges follow the curvature of the drum, as shown in Fig. 2, and at their ends they are connected to the longitudinal troughs 17 so that a continuous trough or ink-receiver is provided, extending entirely around the stencil-carrier. In this way no matter what position the drum is left in when operation of the machine is discontinued, the ink remaining upon the stencil-carrier cannot flow beyond the walls of the ink-receiver; its flow is therefore restricted so that it cannot spread upon the parts of the machine where it would be apt to soil the hands of the operator or the sheets being imprinted upon and thus make the use of the machine inconvenient and time-consuming.

The drum is rotated by means of a gear 19 which is detachably secured to the shaft or one of the heads of the drum 4. This gear meshes with a pinion 20 on a stub-shaft carried by the side-frame 1 and provided with an operating handle 21. A train of gears 22 connects the pinion 20 with a gear 23 mounted upon a shaft 24 which is mounted for rotation in bearings formed in the side-frames of the machine. Shaft 24 carries a gear 25 which meshes with a gear 26 carried by a sleeve 27, shown in Fig. 6. This sleeve is rotatable upon a barrel 28 having a central opening therethrough to receive the end of a rod 29. The side-frame 1 has an opening therein which forms a bearing for one end of the sleeve 27 and through which the barrel 28 projects. The opposite end of rod 29 is received in a bearing formed in the opposite side-frame 2. The end of the shaft 29 which passes through the barrel 28 is threaded and receives a knob or hand-nut 30. The end of this nut is provided with a circumferential flange which fits into a recess formed in the end of the barrel 28 and projections 31 on the end of barrel 28 are turned down over the flange on the nut 30. In this way nut 30 and barrel 28 may be rotated relatively but they are held against relative axial movement. In the barrel 28 is a lengthwise slot 32 which receives a key 33 secured upon the shaft 29 so that shaft 29 and barrel 28 are splined. The barrel 28 also has an inclined groove 34 (Fig. 7) therein which receives a pin 35 carried by the sleeve 27. This pin is forced into the groove 34 by a spring and plug as is shown in Fig. 6. Shaft 29 has a mutilated gear 36 and a Geneva stop-plate 37 secured thereon at the end of the sleeve 27. The stop-plate 37 is provided with guides 38 which project over a flange on the end of sleeve 27 to assist in holding the parts in proper relative position. The mutilated gear 36 and stop-plate 37 coact with a pinion 39 and stop-plate 40 (Fig. 3), respectively, secured upon a sleeve 41 which is loosely mounted upon the shaft 24. This sleeve 41 carries a plurality of sheet-forwarding devices 42 in the form of sectors (Figs. 2 and 3). Each sector 42 coacts with a roller 43 which directly overlies the sector, all of the several rollers 43 being mounted upon a shaft 44 whose ends are received in slots formed in the side-frames and are pressed downwardly by springs 45 (Fig. 2).

When the drum is rotated continuously by handle 21 the train of gears 22, 23, 25, 26 operates to rotate the sleeve 27 continuously and this continuous rotary movement is imparted through pin 35 to barrel 28 and through spline 33 to shaft 29, gear 36 and stop-plate 37. These two last mentioned parts impart intermittent rotary movement to the pinion 39, sleeve 41 and sheet-forwarding devices 42 and 43. The gearing is so arranged that the sheet-forwarding sectors 42 will make one rotation during each rotation of the drum 4 but the rotations of the sectors 42 are intermittent while those of the drum are continuous; furthermore, the sectors 42 are rotated at the same surface speed as that of the drum 4.

When the sheets are forwarded into position for coaction with the forwarding devices 42 and 43 they are arrested by stops 7 against which the forward edges of the sheets abut. At the proper time the sectors 42 will be turned through one revolution, will grip the sheet between them and the rollers 43 and will forward the sheet until its forward edge is projected over the pressure-roller whereupon the pressure-roller is raised into coaction with the drum and the sheet is gripped and forwarded by the drum and pressure-roller so that the movement of the sheet is continuous. For this reason great importance is attached to the time in the rotation of the drum when the rotation of the sectors 42 begins for this time determines the extent of the feeding movement of the sheet before the latter is gripped by the drum and pressure-roller. And in order to permit of making an adjustment whereby accurate registration of the printed matter may be secured, means are provided for effecting an adjustment of the time in the rotation of the drum when the rotation of the sectors 42 begins. This adjustment is effected by the knob 30. By turning this knob upon the shaft 29, the coacting threads thereof will cause the knob to move axially upon the shaft 29 carrying the barrel 28 with it. As the barrel so moves axially it will be caused to rotate by reason of the inclined slot therein coacting with the pin 35 on the sleeve 27. When barrel 28 rotates thus it causes shaft 29 to rotate with it by reason of the spline 33 and the gear 36 and stop-plate 37 are rotated with shaft 29. In this way an adjustment is effected of the position of gear 36 which drives the sheet-forwarding devices relatively to the gear 26 which drives the gear 36. Thus, the time when the intermittent rotation of the sheet-forwarding sectors 42 begins may be advanced or retarded with respect to the rotation of the drum. To facilitate making this adjustment the barrel 28 may be provided with a plurality of circumferential grooves 46 with which an index 47 secured to the side-frame 1 coacts. These grooves 46 are preferably so positioned that movement of barrel 28 a distance equal to the distance between adjacent grooves will effect a change in the point of printing upon a sheet equal to the distance between successive lines of single space type-written matter. By reference to Fig. 3 it will be seen that the barrel 28 and the knob 30 project through the side-frame 1 a short distance below the operating handle of the machine so that these parts may be readily manipulated by the operator; furthermore, the amount of shifting of gear 36 effected by a complete rotation of knob 30 is so small as to permit of delicate regulation so as to get exact registration.

The pressure-roller 5 is carried by arms 48 which are pivotally mounted upon the side-frames of the machine and drawn upward by springs 49. A rock-shaft 50 extends between the side-frames, and adjacent to the side-frame 1 it has an arm 51 secured thereto. An extension 52 on this arm overlies the end of the adjacent arm 48 and carries a roller 53 which coacts with cams 54 and 55 secured to the adjacent head of the drum 4. At the other side of the machine and adjacent to the side-frame 2 the rock-shaft 50 has a lever 56 (Fig. 2) secured thereon whose end overlies the end of the adjacent arm 48. The cam 54 engages roller 53 and thus depresses the pressure-roller 5 just before the forward end of the stencil-sheet on the drum comes over the pressure-roller 5. Immediately thereafter the pressure-roller is allowed to rise into coaction with the drum if a sheet of paper has been forwarded between the drum and pressure-roller so as to receive an impression but if no sheet of paper has been fed forward the pressure-roller is not allowed to rise. This control of the movement of the pressure-roller is effected by a reciprocating stop which coacts with the end of lever 56 distant from the pressure-roller 5. When the pressure-roller is moved down by cam 54, the lever 56 and its shaft 50 rock so as to follow the downward movement of the pressure-roller and the distant end of lever 56 is raised. If no sheet is fed to the drum and pressure-roller, a stop is caused to move under the distant end of lever 56, so that when cam 54 passes roller 53, the lever 56 prevents the pressure-roller 5 from being raised. But if a sheet has been forwarded to the drum and pressure-roller, the stop will not be allowed to coact with lever 56 and as soon as cam 54 passes the roller 53, pressure-roller 5 will be raised into coaction with the drum by its springs 49. The stop above referred to is actuated by cams secured upon the shaft 24 beyond the end of sleeve 41 as shown in Fig. 3. The mechanism for effecting this control of the movement of the pressure-roller by the presence or absence of a sheet of paper in position to be imprinted upon will not be described in detail herein as it is substantially the same as that illustrated in Patent No. 1,024,186 heretofore granted to me. The mechanism for operating the stops 7 is also substantially the same as that shown in the above mentioned patent and therefore need not be described in detail. The stops are moved downwardly so as to withdraw them from the path of movement of a sheet of paper just before the sheet is gripped by the sectors 42, this movement of the stops being effected by a cam on the shaft 24.

The feed-board 6 of the machine is supported by a shaft 60 extending between the side-frames upon which the board is adapted to be rocked by an arm 61 (Fig. 2) secured to a rock-shaft 62. This shaft 62 has an arm 61' secured thereon and projecting upwardly therefrom, the end of this arm carrying a roller adapted to bear upon the surface of a cam 63 secured upon the shaft 24. Arm 61' also has a downward extension to which one end of a spring 64 is connected which spring holds the roller on arm 61' always in engagement with the periphery of cam 63. Another extension 65 of the arm 61' has a stud thereon with which a latch 66 (Fig. 3) is adapted to coact to hold the feed-board in an inoperative position while arranging a pile of paper thereon. A sheet-separating and forwarding roller 67 made in a plurality of sections is provided upon a shaft 68 extending between the side-frames of the machine. At one end this shaft carries a pinion 69 which meshes with a gear 70 mounted on a suitable stub-shaft and meshing with the gear 23, so that during the operation of the machine the sheet-separating and forwarding roller 67 is continuously rotated. A roller 70' coacts with the roller 67 at times, this roller 70' being arranged for vertical reciprocatory movement. Roller 70' is carried by arms 71 mounted on a shaft 72 extending between the side-frames of the machine. An arm 73 (Fig. 4) is secured to the shaft 72 and depends therefrom, its lower end being provided with a roller which coacts with a cam 74 secured on shaft 24; a spring 75 holds the roller always in contact with the cam. An adjustable stop-bar 76 is adapted to bear upon the top of the sheet-pile at times and to be raised from the pile at other times. This bar is carried by arms 77 which are pivotally mounted upon the side-frames of the machine. One of these arms is extended beyond its pivot as shown in Fig. 3 and carries a roller coacting with the cam 78 secured upon the end of the shaft 24. The forward end of the sheet-pile upon the board 6 bears against a plate 79 which is adapted to be reciprocated vertically. At its upper end this plate has a lip 80 adapted to coact with the top of the pile. The plate 79 is mounted upon a stationary plate 81 in such a way as to permit it to be moved vertically. At its lower end plate 79 is connected to arms 82 secured upon a rod 83 extending between the side-frames of the machine, and one of the arms 82 (Fig. 3) is provided with an upwardly extending portion 84 carrying a roller which is adapted to bear upon the periphery of a cam 85. A spring 86 acts upon shaft 83 in a direction to hold the roller on the arm 84 in contact with the cam 85.

When the machine is in operation, the roller 67 is turned in the direction of the arrow on Fig. 2. Assuming that the feed-board has been rocked by arm 61 so as to carry the pile of sheets into engagement with the under side of the roller 67, the lip 80 at the upper end of wall 79 will be raised slightly above the sheet pile and the adjustable stop-bar 76 will be lowered upon the surface of the sheet-pile. The rotation of the roller 67 will then cause the top sheet of the pile to be buckled between it and the stop-bar 76. Immediately after the edge of a sheet has been moved far enough to carry it from under the lip 80, the latter will be lowered upon the top of the pile by the arms 82 and 84 and the cam 85 so that if a buckling movement of the second and succeeding sheets has been started, these sheets will be caught by the lip 80 and held from further buckling movement. The first sheet, however, will be buckled until its edge is caught by the fluted surface of the roller 67 and this edge will then be carried around upon the upper surface of roller 67. While this is occurring the feed-board will be rocked so as to carry the pile out of coaction with the roller and this rocking movement will be so great as to carry the pile out of coaction with the lip 80 so that if the second and succeeding sheets have been partially buckled they will be released by lip 80 and allowed to flatten on the pile. At the same time the stop-bar 76 will be raised out of coaction with the pile. After the edge of the top sheet has been carried over roller 67 the roller 70' will be lowered upon the sheet by its cam and further rotation of roller 67 will cause the sheet to be forwarded until its edge passes under the forwarding rollers 43 and engages the stops 7.

In order to facilitate the separation of the top sheet from the succeeding sheets, means are provided for delivering a blast of air against the forward edge of the sheet-pile so as to loosen the sheets slightly. This means includes a bellows which is operated at regular intervals during the rotation of the drum of the machine and the rocking movement of the feed-board. The bellows consists of a stationary member 86 and the movable member 87, the movable member being raised by a spring 88. The movable member is depressed by rollers carried on the ends of arms 89 which are secured on shaft 29. The bellows is connected by a plurality of tubes 90 with openings in the vertical plate 81, the plate 79 being provided with slots alining with these openings. Just as the edge of the sheet-pile is lowered away from the roller 67 the arms 89 depress the movable wall 87 of the bellows so as to deliver a blast of air through the tubes 90 against the edge of the sheet-pile. In this way air is caused to enter between the uppermost sheets of the pile and thus greatly facilitates the separation of the top-sheet of the pile by the roller 67 when the pile is again raised into contact with that roller.

Having described my invention, what I claim as new therein and desire to secure by Letters Patent of the United States is:

1. In a stencil-duplicating machine, the combination of a drum, means for rotating the same, a pressure-roller coacting with the drum, paper-feeding devices actuated intermittently by said means for feeding sheets between the drum and pressure-roller, and means for effecting an adjustment of the time of operation of said devices relative to the rotation of the drum comprising two relatively adjustable members arranged in the actuating connection to said devices one of which has an inclined slot therein and the other of which has a pin entering said slot, substantially as set forth.

2. In a stencil-duplicating machine, the combination of a drum, a pressure-roller coacting with the drum, a pair of sheet-feeding members displaced laterally from the pressure-roller and in position for feeding sheets between them to the line of coaction of the drum and pressure-roller, means for rotating the drum, a shaft adjacent to the drum and parallel to the axis thereof, a train of gearing independent of the pressure-roller and including an intermittent gear mounted on said shaft for connecting said rotating means to one of said sheet-feeding members for intermittently rotating said member one revolution during each revolution of the drum, and means for effecting an adjustment of the position of said intermittent gear with respect to the position of the drum, substantially as set forth.

3. In a stencil-duplicating machine, the combination of a drum, a pressure-roller coacting with the drum, paper-feeding devices for feeding sheets between the drum and pressure-roller, means for rotating the drum and for intermittently rotating said devices one revolution during each revolution of the drum at the same surface speed as the drum and means for effecting an adjustment of the time of rotation of the paper-feeding devices with respect to the rotation of the drum comprising two relatively adjustable members in the driving connection to the paper-feeding devices one of which has an inclined slot therein and the other of which has a pin entering said slot, substantially as set forth.

4. In a stencil-duplicating machine, the combination of a drum, a pressure-roller coacting with the drum, a feedboard for supporting a pile of paper, sheet-feeding devices for feeding sheets successively from the pile, means for rotating said drum continuously and for operating the sheet-feeding devices automatically once during each revolution of the drum, a stop for arresting the sheets fed by said devices, a sheet-forwarding member for forwarding the sheets from the stop into coaction with the drum and pressure-roller, and connections from said means to the sheet-forwarding member for rotating the latter intermittently through one revolution during each revolution of the drum, at the same surface speed as that of the drum, substantially as set forth.

5. In a stencil-duplicating machine, the combination of a drum, a pressure-roller coacting with the drum, a feedboard for supporting a pile of paper, sheet-feeding devices for feeding sheets successively from the pile, means for rotating said drum continuously and for operating the sheet-feeding devices automatically once during each revolution of the drum, a stop for arresting the sheets fed by said devices, a sheet-forwarding member for forwarding the sheets from the stop into coaction with the drum and pressure roller, connections from said means to the sheet-forwarding member for rotating the latter intermittently through one revolution during each revolution of the drum and at the same surface speed as that of the drum, and means for effecting an adjustment of the time when the sheet-forwarding member makes its revolution with respect to the rotation of the drum, substantially as set forth.

6. In a stencil-duplicating machine, the combination of a drum, a pressure-roller coacting with the drum, a feed-board for supporting a pile of paper, sheet-feeding devices for feeding sheets successively from the pile, means for rotating said drum continuously and for operating the sheet-feeding devices, a stop for arresting the sheets fed by said devices, rotary sheet-forwarding devices for forwarding the sheets from the stop into coaction with the drum and pressure-roller, connections from said means to the sheet-forwarding devices for rotating the latter once during each revolution of the drum and means for effecting an adjustment of the time of operation of the sheet-forwarding devices with respect to the rotation of the drum including two relatively adjustable members one of which has an inclined groove therein and the other of which has a pin entering said groove, substantially as set forth.

7. In a stencil-duplicating machine, the combination of a drum, means for rotating the same, a pressure-roller coacting with the drum, paper-feeding devices for feeding sheets to the drum, and connections from said means to said devices comprising a sleeve rotated continuously when the drum is rotated, a barrel within the sleeve connected to the sleeve by a pin and an inclined slot, a shaft within the barrel and splined thereto, means for moving the barrel and shaft axially relatively and an intermittent gear driven by said shaft and actuating said devices, substantially as set forth.

8. In a stencil-duplicating machine, the combination of a drum, means for rotating the same, a pressure-roller coacting with the drum, paper-feeding devices for feeding sheets to the drum, and connections from said means to said devices comprising three concentric members two of which are splined and two of which are connected by a pin and an inclined slot, and means for effecting relative axial movement of the two members which are splined, substantially as set forth.

9. In a stencil-duplicating machine, the combination of a drum, means for rotating the same, a pressure-roller coacting with the drum, a feed-board for supporting a pile of sheets in position for feeding them between the drum and pressure-roller, a sheet-feeding roller driven by said means and operating to buckle the top sheet of the pile and feed the same forward, means for rocking the feed-board to carry the pile of sheets thereon into and out of contact with the sheet-feeding roller, a bellows, means for operating the bellows once during each revolution of the drum and while the sheet-pile is lowered away from the sheet-feeding roller and means for conveying the air from the bellows against the edge of a pile of sheets on said feed-board, substantially as set forth.

10. In a stencil-duplicating machine, the combination of a drum, means for rotating the same, a pressure-roller coacting with the drum, a feed-board for supporting a pile of sheets in position for feeding them between the drum and pressure-roller, a sheet-feeding roller driven by said means and coacting with the top of the sheet-pile, means for rocking the feed-board to carry the pile away from said roller once during each revolution of the drum, a bellows, means for operating the same once during each revolution of the drum and while the sheet-pile is lowered away from the sheet-feeding roller, and means for conveying air from the bellows against the edge of the pile of sheets, substantially as set forth.

11. In a stencil-duplicating machine, the combination of a drum, means for rotating the same, a pressure-roller coacting with the drum, a feed-board for supporting a pile of sheets in position for feeding them between the drum and pressure-roller, a feeder, means for rocking the feed-board to carry the pile of sheets thereon into and out of contact with the feeder, means for causing the feeder to buckle the top sheet of the pile adjacent to one end of the pile and feed the sheet over the feeder toward the drum once during each rotation of the drum, a bellows, means for operating the bellows once during each revolution of the drum and while the sheet-pile is lowered away from the feeder, and means for conveying the air from the bellows against said end of the pile of sheets on the feed-board, substantially as set forth.

This specification signed and witnessed this 6th day of June, 1912.

ALBERT B. DICK.

Witnesses:
 I. McIntosh,
 J. F. Collin.